(12) United States Patent
Durant et al.

(10) Patent No.: US 12,140,432 B2
(45) Date of Patent: Nov. 12, 2024

(54) SYSTEM AND METHOD FOR GENERATING AN AIRCRAFT FLIGHT TRAJECTORY

(71) Applicant: Satavia Limited, Cambridge (GB)

(72) Inventors: Adam Durant, Cambridge (GB); Antony Rix, Cambridge (GB); Shikhar Goenka, Cambridge (GB); Darren Gallagher, Cambridge (GB); Lisa Lentati, London (GB)

( * ) Notice: Subject to any disclaimer, the term of this patent is extended or adjusted under 35 U.S.C. 154(b) by 264 days.

(21) Appl. No.: 17/619,715

(22) PCT Filed: Jun. 29, 2020

(86) PCT No.: PCT/IB2020/056125
§ 371 (c)(1),
(2) Date: Dec. 16, 2021

(87) PCT Pub. No.: WO2020/261238
PCT Pub. Date: Dec. 30, 2020

(65) Prior Publication Data
US 2022/0307838 A1 Sep. 29, 2022

(30) Foreign Application Priority Data
Jun. 28, 2019 (GB) .................................. 1909354

(51) Int. Cl.
*G01C 21/20* (2006.01)
*G06Q 50/40* (2024.01)
*G08G 5/00* (2006.01)

(52) U.S. Cl.
CPC ........... *G01C 21/20* (2013.01); *G08G 5/0017* (2013.01); *G06Q 50/40* (2024.01)

(58) Field of Classification Search
CPC ...... G01C 21/20; G01C 23/00; G08G 5/0017; G08G 5/0013; G08G 5/0026; G08G 5/0082; G08G 5/0004; G06Q 50/40; G06Q 10/06
See application file for complete search history.

(56) References Cited

U.S. PATENT DOCUMENTS 6,473,677 B1 10/2002 Hershey et al.
9,483,951 B1 * 11/2016 McCusker ............ B64D 45/00
(Continued)

FOREIGN PATENT DOCUMENTS

GB 2532957 A 6/2016

OTHER PUBLICATIONS

Combined Search and Examination Report under Sections 17 and 18(3) issued in GB Patent Application No. GB1909354.1 on Aug. 5, 2019, 8 pages.
(Continued)

*Primary Examiner* — Rami Khatib
(74) *Attorney, Agent, or Firm* — RC Trademark Company

(57) ABSTRACT

There is provided a flight trajectory system that estimates contaminant exposure experienced by a flight for scheduling of flight maintenance interventions, comprising: at least one input interface that receives at least one trajectory of a flight comprising flight track points; a storage medium containing executable instructions for executing a flight trajectory algorithm and a database of flight trajectory data; and a computing arrangement coupled to the at least one input interface and the storage medium, wherein the computing arrangement receives the at least one trajectory of the flight and interrogates the database of flight trajectory data to: validate the flight track points, wherein the flight track points are validated based on at least one performance of the flight, generate a fixed trajectory for the flight based on the
(Continued)

validated flight track points and the flight trajectory algorithm, and analyze, using a flight trajectory model, the fixed trajectory of the flight to estimate contaminants exposure of the flight on the fixed trajectory for scheduling flight maintenance interventions, and wherein the contaminants comprise at least one of: dust, ice, atmospheric aerosol particles or corrosive gases.

15 Claims, 7 Drawing Sheets

(56) References Cited

U.S. PATENT DOCUMENTS

| | | | | |
|---|---|---|---|---|
| 11,268,449 | B2 * | 3/2022 | Escriche | F04D 27/001 |
| 2005/0007272 | A1 | 1/2005 | Smith et al. | |
| 2010/0154512 | A1 * | 6/2010 | Spinelli | G01W 1/08<br>73/29.01 |
| 2017/0323274 | A1 * | 11/2017 | Johnson | G05B 13/041 |
| 2017/0361947 | A1 | 12/2017 | Kessie et al. | |
| 2019/0005585 | A1 | 1/2019 | Biason et al. | |
| 2020/0175628 | A1 * | 6/2020 | Srinivasan | G06Q 50/265 |

OTHER PUBLICATIONS

International Search Report and Written Opinion of the International Searching Authority issued in International Patent Application No. PCT/IB2020/056125 on Oct. 9, 2020, 11 pages.

International Preliminary Report On Patentability issued in International Patent Application No. PCT/IB2020/056125 on Jan. 6, 2022, 9 pages.

* cited by examiner

SYSTEM AND METHOD FOR GENERATING AN AIRCRAFT FLIGHT TRAJECTORY

TECHNICAL FIELD

The present disclosure relates generally to a system that generates a trajectory for an aircraft by interpolating incomplete flight track point(s)/invalid flight track point(s) in at least one aircraft flight trajectory using a flight trajectory algorithm; moreover, the present disclosure relates to a method for (of) generating a trajectory for an aircraft. Moreover, the aforesaid system employs, when in operation, machine learning techniques for estimating contaminants exposure of the aircraft on the generated trajectory. Furthermore, the present disclosure is concerned with computer program products comprising a non-transitory computer readable storage medium having computer-readable instructions stored thereon, the computer-readable instructions being executable by a computerized device comprising processing hardware to execute the aforesaid methods.

BACKGROUND

Environmental contaminants such as dust, ice, atmospheric aerosol particles and corrosive gases pose a hazard to aircraft when on flights. The environmental contaminants potentially accumulate inside aircraft engines and result in detrimental effects, for example causing wear or blockage, adhering to components thus clogging them, damaging protective surfaces, and inducing corrosion. Moreover, the environmental contaminants may damage other parts of the aircraft, not only their engines. Such detrimental effects may damage engines of the aircraft, thus reducing engine life, and potentially even cause in-flight failures, all with resulting cost impact and risk to human lives.

A flight trajectory or a flight path is the path that an aircraft follows through space as a function of time. For accurately estimating contaminants exposure of the aircraft during its flight, a complete and accurate flight trajectory comprising where the aircraft flew is essential. Currently, the aircraft's position is recorded through Automatic Dependent Surveillance-Broadcast (ADS-B) systems. However, the data recorder of the ADS-B system produces gaps in the flight trajectory because of the nature of the ADS-B system. The gaps may occur over any part of the flight path, and in particular over the ocean and/or very close to the ground. With the gaps in the flight trajectory, it is not possible to track where the aircraft actually flew. The flight trajectory having information about where an aircraft flew may help to estimate contaminants to which the aircraft is exposed.

Therefore, in light of the foregoing discussion, there exists a need to overcome the aforementioned drawbacks in existing approaches for generating a trajectory for an aircraft without any gaps and estimating environmental contaminant exposure of the aircraft more accurately.

SUMMARY

The present disclosure seeks to provide a system that generates a trajectory for an aircraft using a flight trajectory algorithm. The generated trajectory is then able to be used in estimating contaminants exposure of the aircraft on the generated trajectory.

According to a first aspect, there is provided a flight trajectory system that estimates contaminant exposure experienced by a flight, comprising: at least one input interface that receives at least one trajectory of a flight comprising flight track points;

a storage medium containing executable instructions for executing a flight trajectory algorithm and a database of flight trajectory data; and a computing arrangement coupled to the at least one input interface and the storage medium, wherein the computing arrangement receives the at least one trajectory of the flight and interrogates the database of flight trajectory data to validate the flight track points, wherein the flight track points are validated based on at least one performance of the flight, generate a fixed trajectory for the flight based on the validated flight track points and the flight trajectory algorithm, and analyze, using a flight trajectory model, the fixed trajectory of the flight to estimate contaminants exposure of the flight on the fixed trajectory, and wherein the contaminants comprise at least one of: dust, ice, atmospheric aerosol particles or corrosive gases.

The system thus estimates the contaminants based on the trajectory established in part, by identifying individual erroneous measurements, and/or by interpolating based on aircraft performance data.

Unlike the prior art the system according to herein thus provide a trajectory that in fact meets the requirements for calculating contaminant exposure, and which is able to operate even when high quality, closely spaced periodic data points do not exist, are missing or contain errors in location or altitude.

The system furthermore does not simply connect two points when establishing the trajectory, but takes into account that an aircraft cruises at much higher altitude, adequately represent the altitude during the flight by providing a general approach to interpolate a representative flight path given only very limited data. The system according to herein also take into account an aircraft's speed, ability to accelerate/decelerate, or rate of climb/descend, and can therefore adequately reproduce the times when an aircraft passes each ground location, or its altitude at the time, accounting for variations according to phase of flight or altitude, by reference to performance data of a type or types of aircraft. The system is further not reliant on weather data nor detailed air traffic control data. In general, such detailed air traffic control information is held only for a limited period and is available to limited parties and are therefore generally not accessible for the purposes of calculating contaminant exposure.

The system is also not reliant on previous observations of aircrafts flying the same route or flight plan/trajectory. Furthermore, the system herein identifies erroneous data points which provides for a more accurate trajectory and estimation. The system herein is thus superior to the prior art.

The invention is of advantage in that improved generated trajectory of the flight can assist to improve the estimation of contaminants exposure of an aircraft in flight on the generated trajectory and scheduling of the flight maintenance.

According to a second aspect, there is provided a method for (of) generating a fixed trajectory for a flight, using a computer arrangement for estimating contaminant exposure experienced by a flight, comprising:

(a) receiving at least one trajectory of a flight comprising flight track points;

(b) validating the flight track points of the at least one trajectory to check that the flight track points reflect at least one performance of the flight;

(c) generating, using the flight trajectory algorithm, a fixed trajectory for the flight;

(d) analysing, using a flight trajectory model, the fixed trajectory of the flight to estimate contaminants exposure of the flight on the fixed trajectory, and wherein the contaminants comprise at least one of: dust, ice, atmospheric aerosol particles or corrosive gases.

According to a third aspect, there is provided a computer program product comprising instructions to cause the system of the first aspect to carry out the method of the second aspect.

It will be appreciated that the aforesaid method of the present disclosure is not merely a "method of doing a mental act" as such, but has a technical effect in that the method employs measurement data and functions as a form of technical control using machine learning of a technical artificially intelligent system; the method involves building an artificially intelligent machine learning model and/or using the machine learning model to address, for example to solve, the technical problem of generating the fixed trajectory of the flight for estimating contaminants exposure of the flight on the generated trajectory.

Embodiments of the present disclosure substantially eliminate or at least partially address the aforementioned drawbacks in existing approaches for generating a fixed trajectory for a flight without any gaps and estimating environmental contaminant exposure of the flight more accurately.

Additional aspects, advantages, features and objects of the present disclosure are made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

DETAILED DESCRIPTION OF EMBODIMENTS

Figure 1:
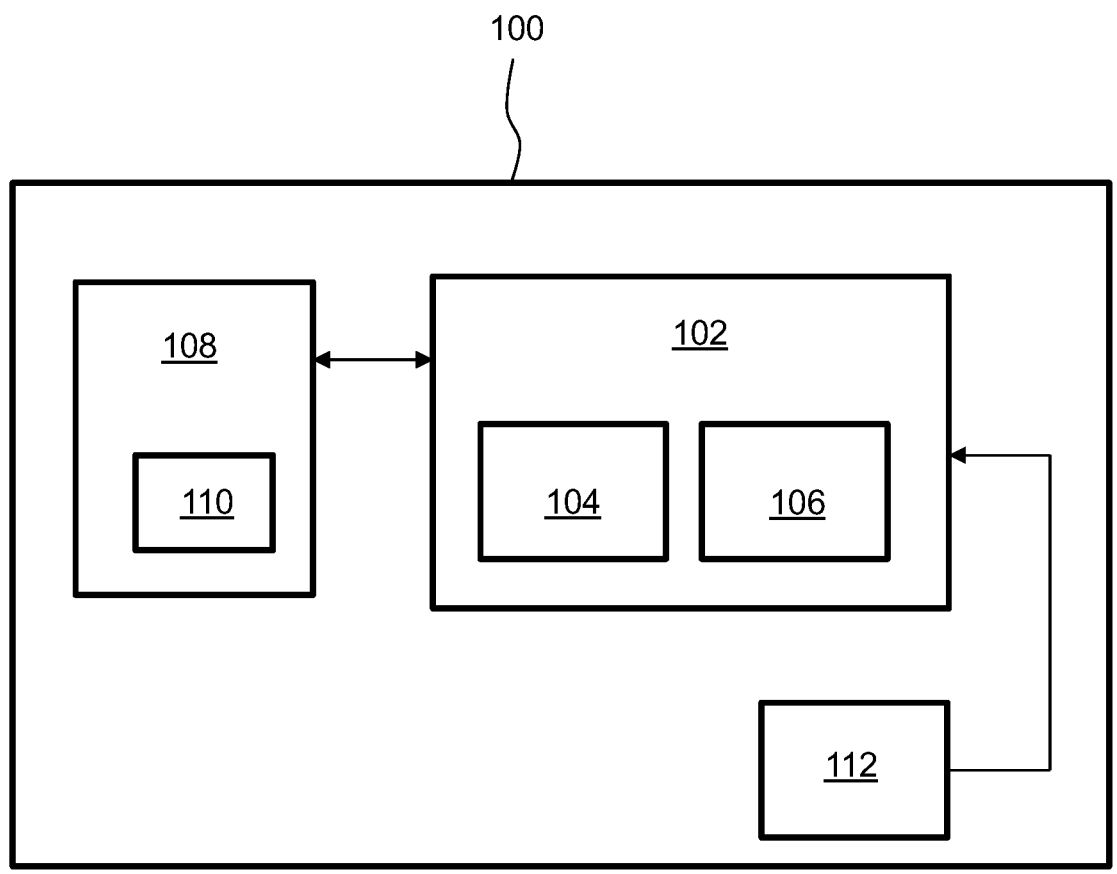
FIG. 1 is a schematic illustration of a system in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

According to a first aspect, there is provided a flight trajectory system that estimates contaminant exposure experienced by a flight, comprising:

at least one input interface that receives at least one trajectory of a flight comprising flight track points;

a storage medium containing executable instructions for executing a flight trajectory algorithm and a database of flight trajectory data; and a computing arrangement coupled to the at least one input interface and the storage medium, wherein the computing arrangement receives the at least one trajectory of the flight and interrogates the database of flight trajectory data to validate the flight track points, wherein the flight track are validated based on at least one performance of the flight, generate a fixed trajectory for the flight based on the validated flight track points and the flight trajectory algorithm, and analyze, using a flight trajectory model, the fixed trajectory of the flight to estimate contaminants exposure of the flight on the fixed trajectory, and wherein the contaminants comprise at least one of: dust, ice, atmospheric aerosol particles or corrosive gases.

The present system, when in operation, thus generates the trajectory, for example a fixed trajectory, for the flight for estimating contaminants exposure of the flight on the generated trajectory and that may be used for scheduling the flight maintenance. The present system thus tracks, when in operation, where an aircraft flew using the generated trajectory and estimates the contaminants exposure of the aircraft more accurately. The present system thus permits the scheduling of flight maintenance interventions based on the estimated contaminants exposure that the aircraft experiences on the flight. The system combines observation data, with data from numerical weather prediction and live aircraft tracking, to provide environmental exposure monitoring for individual aircraft. The said system beneficially allows aircraft operators to adjust aircraft flight and maintenance plans to minimise unscheduled maintenance, and therefore extend engine lifetime. Further beneficially, the system adjusts aircraft tail assignment to move high risk assets to low exposure routes.

The system is configured to validate the flight track points, wherein the flight track points are validated based on at least one performance of the flight. In an embodiment, validating the flight track point based on the at least one performance of the flights, wherein the at least one performance of the flight includes determination of aircraft configuration, aircraft type, take-off weight, fuel load and/or fuel consumed. Beneficially, the at least one performance of the flight includes modelling rate of change of airspeed and altitude with reference to a model of kinetic energy, drag and thrust, using parameters appropriate to the aircraft type.

The present system is configured to generate the fixed trajectory for the flight by interpolating latitudes and longitudes at (i) a flight track point without latitudes and longitudes and (ii) at least one gap in the at least one trajectory of the flight if the flight track point without latitudes and longitudes and the at least one gap in the at least one trajectory of the flight are detected;

interpolating altitudes at a flight track point without altitudes if the flight track point without altitudes is detected; and
   extrapolating take-off of the flight by modelling beginning of the flight up to the first flight track point of the at least one trajectory or landing by modelling the end of the flight from the last flight track point of the at least one trajectory, if not available.

The present system thus generates the trajectory for the flight without any gaps when monitoring, thereby improving the accuracy of estimation of the flight contaminant exposure. The present system potentially assists to prioritise the flight maintenance interventions based on the estimated contaminants exposure experienced by the aircraft. Beneficially, the system allows filling in paths representative of actual aircraft performance, where data does not generally exist in conditions such as low levels and remote ocean locations. The system further beneficially allows in generation of the trajectory where data is very sparse as is often the case in practice.

The at least one input interface optionally obtains the at least one trajectory of the flight comprising flight track points from a server. The flight trajectory system may be communicatively connected to a user device of a user for receiving the at least one trajectory of the flight comprising flight track points. The user device optionally comprises the at least one input interface. The at least one input interface optionally obtains at least one trajectory of the flight from an Automatic Dependent Surveillance-Broadcast (ADS-B system). The fixed trajectory of the flight is optionally provided to an operating personnel (e.g. pilot) to implement in the flight. The fixed trajectory is optionally implemented in the flight using an automated system. The fixed trajectory is optionally displayed/shown to the operating personnel through at least one output interface. The fixed trajectory is optionally communicated to the user device/the automatic system through a communication network. The user device optionally comprises the at least one output interface.

In an embodiment, the control module is communicatively connected to the server via the communication network. The control module is connected to the at least one input interface that receives, when in operation, the at least one trajectory of the flight comprising flight track points and the at least one input interface provides the at least one trajectory of the flight to the control module. The control module is connected to at least one output interface that provides, when in operation, at least one fixed trajectory to the user through the user device.

Hardware components employed to implement the present system optionally include a control module containing a processor, a memory and at least one storage medium containing the database associated with the present system. The database stores the flight trajectory data. In an embodiment, the aforesaid hardware components are associated with a server, and at least one input interface is associated with a client side of the server or the user device. The server is optionally a tablet computer, a desktop computer, a personal computer or an electronic notebook. In an embodiment, the server is optionally a cloud service. The user device optionally comprises a personal computer, a smartphone, a tablet, a laptop or an electronic notebook. The components of the system are in communication via the communication network that is optionally a wired network or a wireless network.

The server optionally comprises a database of flight trajectory data as a function of location and time and a historical database of historical flight trajectory data relating to a plurality of flights.

The system optionally schedules maintenance interventions for the aircraft in response to the estimated contaminants exposure that will be experienced on the flight. The system optionally schedules maintenance interventions including both short-term interventions such as engine washes to clean out dust, and long-term interventions such as major maintenances or shop visits. The system optionally prioritises maintenance for the flight according to the estimated contaminants exposure of the aircraft along the flight.

According to an embodiment, the at least one input interface is configured to receive historical flight trajectory data relating to the plurality of flights for training the flight trajectory algorithm.

The system optionally generates, for example, for ease of processing, a table of the data for the historical flight trajectory data relating to the plurality of flights for training the flight trajectory algorithm. In an example embodiment, the system uses at least one of regression model, artificial intelligence (AI), Machine Learning or a neural network algorithm for generating the flight trajectory model. Such regression model, artificial intelligence (AI), Machine Learning or a neural network algorithm will be understood by a person skilled in the art of computer system design. It will be appreciated in embodiments of the present disclosure that the flight trajectory algorithm of the flight trajectory system is trained on historical flight trajectory data relating to the plurality of flights, to define various parameters of the algorithm, and then, thereafter, the flight trajectory algorithm is applied to flight track points data pertaining to the target flight to generate its complete and accurate trajectory for the flight.

The system optionally determines historic contaminant exposure by analysing the historical flight trajectory data of the plurality of flights associated to the set of training data over location and time and estimates the contaminant concentration of the plurality of flights for each trajectory using the flight trajectory model.

According to an embodiment, the at least one trajectory of the flight comprises at least one of time series of times, latitudes, longitudes or altitudes associated with the flight track points.

According to an embodiment, the at least one input interface is configured to receive at least one of departure airport, a departure time, an arrival airport, an arrival time or an aircraft type of the flight.

The at least one input interface obtains data pertaining to the departure airport, the departure time, the arrival airport, the arrival time or the aircraft type of the flight from the server. The at least one input interface optionally obtains data pertaining to the departure airport, the departure time, the arrival airport, the arrival time or the aircraft type of the flight from the user device. Optionally, the data pertaining to the departure airport, the departure time, the arrival airport, the arrival time of the flight are obtained from Airport International Civil Aviation Organization (ICAO) or International Air Transport Association (IATA) codes. Optionally, the aircraft type of the flight is obtained aircraft type ICAO code.

In an embodiment, the at least one input interface is configured to receive a resolution data on which the flight track points in the at least one trajectory is filled.

According to an embodiment, the computing arrangement is configured to format the flight track points into a predefined format by converting timestamps in seconds if the timestamps are in different formats;
converting latitudes and longitudes in decimals if the latitudes and longitudes are in different formats; and
converting altitudes in meters above mean sea level if the altitudes are in different formats.

The system advantageously accepts the flight track points in any format and converts it into the predefined format before validating the flight track points.

According to an embodiment, the computing arrangement is configured to validate the flight track points by discarding flight track points with timestamps that are associated with incorrect latitudes and longitudes, incorrect ground speeds, or discarding flight track points that are associated with incorrect vertical speeds, wherein the incorrect latitudes and longitudes comprises latitudes and longitudes exceeding predetermined values of longitude and latitude, wherein the incorrect ground speed corresponds to a ground speed exceeding or receding a predetermined range of ground speed and wherein the incorrect vertical speed corresponds to a vertical speed exceeding or receding a predetermined range of vertical speed, and selecting one or more flight track points with timestamps that are associated with at least one of: correct latitudes and longitudes, correct ground speeds, or correct vertical speeds, for validation.

In an embodiment, the computing arrangement is configured to discard flight track point(s) with latitudes and longitudes exceeding predetermined values of longitude and latitude; and select correct latitudes, longitudes, ground speed, or vertical speed to validate the track points. Further, the computing arraignment is configured to select one or more flight track points with timestamps that are associated with at least one of: correct latitudes and longitudes, correct ground speeds, or correct vertical speeds, for validation. Beneficially, such selection of correct data and discarding incorrect data enables generate a fixed trajectory for the flight. Further, the flight track point(s) are discarded if the speed of the flight is zero at cruise or too high, in particular above 300 m/s. In an embodiment, the speed is a ground speed or a vertical speed. The ground speed is the horizontal speed of a flight relative to the ground. The system optionally uses a known method in the art to calculate the ground speed and/or vertical speed.

Optionally, in the flight trajectory system the computing arrangement discards incorrect flight track points by:

calculating at least one of: a ground speed or a vertical speed, for each flight track point using at least one of: a latitude data or a longitude data;
generating at least one of: a smoothed average ground speed or a smoothed average vertical speed, using a rolling median or mean method or at least one performance of the flight;
calculating a difference between the ground speed and the smoothed average ground speed and a difference between the vertical speed and the smoothed average vertical speed, respectively for each flight track point; and
discarding the flight track point upon at least one of: a) if the calculated difference for the ground speeds is more than 50 meters per second (m/s), or b) if the calculated difference for the vertical speeds is more than 5 m/s.

Optionally, performance data may be retrieved that is representative of at least one of the maximum, typical and minimum values of at least one of the following: ground speed, vertical speed, airspeed, rate of climb, rate of descent, rate of turn, thrust. Optionally, performance data may be retrieved according to at least one of: type of aircraft, take-off weight, take-off fuel weight, estimated fuel weight following the flight trajectory to a flight track point, thrust.

Optionally, performance data may be determined by reference to a model of an aircraft's energy, considering the kinetic energy, gravitational potential energy, drag and thrust. Beneficially, such a model may permit flight track points to be excluded or fixed where an energy change violates a law of physics or exceeds a permitted range of any one of: drag, thrust, ground speed, vertical speed, airspeed, rate of climb, rate of descent, rate of turn, thrust.

The system advantageously splits the flight track points into a single trajectory when the flight tracks are not split by the flight and then fixes the trajectory.

According to an embodiment, the system using the computing arrangement that is configured to model the altitude at a flight track point without altitudes according to a flight phase if the rate of change of the altitude is not constant or is not provided, optionally considering the performance of the flight through at least one flight phase, where a flight phase may be at comprise: taxiing prior to take-off, take-off, climb, cruise, descent, holding, landing, taxiing following landing.

Optionally, in the flight trajectory system, the computing arrangement is configured to model the latitude and longitude at a flight track point without latitude or longitude according to a flight phase if the ground speed is not constant or is not provided, optionally considering the performance of the flight through at least one flight phase.

Optionally, a flight parameter is considered to exceed a value if it falls above or below a determined maximum or minimum value, where a flight parameter includes any one of latitude, longitude, ground speed, vertical speed, airspeed, rate of climb, rate of decent, rate of turn, thrust.

According to an embodiment, the fixed trajectory comprises at least one of a complete time series of times, latitudes, longitudes, altitudes from when the aircraft is moving on the take-off runway up to when the aircraft reaches a speed of 0 kilometre per hour on the landing runway. Optionally, the flight trajectory may also comprise taxiing prior to take-off or following landing.

In an embodiment, the flight trajectory algorithm additionally uses the departure point, the departure time, the arrival point, the arrival time and the aircraft type as inputs for at least one of (i) modelling the altitude at the flight track point without altitudes according to a flight phase when the rate of change of the altitude is not constant, (ii) modelling beginning of the flight up to the first flight track point of the at least one trajectory or (iii) modelling end of the flight from the last flight track point of the at least one trajectory up to landing.

According to an embodiment, the fixed trajectory comprises quality metrics that indicate a quality of the at least one received trajectory of the flight.

The fixed trajectory optionally comprises a complete trajectory to be flown by the aircraft. The fixed trajectory optionally enables the estimation of contaminants exposure of the aircraft accurately. The quality metrics optionally summaries a quality of the received raw flight trajectory data. Furthermore, the quality metrics optionally describes time periods for which the gaps occurred in the flight trajectory and a number of flight track points that are flagged/eliminated by the validation code.

According to a second aspect, the present disclosure relates to a method for (of) generating a trajectory for a flight of an aircraft, using a computing arrangement, comprising:
(a) receiving at least one trajectory of a flight comprising flight track points;
(b) validating the flight track points of the at least one trajectory, wherein the flight track points are validated based on at least one possible performance of the flight;
(c) generating, using the flight trajectory algorithm, a trajectory for the flight; and
(d) providing the trajectory of the aircraft along the flight for estimating contaminants exposure of the aircraft on the trajectory.

It will be appreciated that the aforesaid present method is not merely a "method of doing a mental act" as such, but has a technical effect in that the method employs measurement data and functions as a form of technical control using machine learning of a technical artificially intelligent system; the method involves building an artificially intelligent machine learning model and/or using the machine learning model to address, for example to solve, the technical problem of generating the fixed trajectory of the flight for estimating contaminants exposure of the flight on the fixed trajectory.

According to an embodiment, the method comprises generating the fixed trajectory for the flight by interpolating latitudes and longitudes at (i) a flight track point without latitudes and longitudes and (ii) at least one gap in the at least one trajectory of the flight if the flight track point without latitudes and longitudes and the at least one gap in the at least one trajectory of the flight are detected, interpolating altitudes at a flight track point without altitudes if the flight track point without altitudes is detected, and extrapolating take-off of the flight by modelling beginning of the flight up to the first flight track point of the at least one trajectory or landing by modelling the end of the flight from the last flight track point of the at least one trajectory, if not available.

According to an embodiment, the method comprises calibrating, training or optimizing the flight trajectory algorithm using historical flight trajectory data relating to a plurality of flights, wherein the flight trajectory algorithm is configured to receive at least one trajectory of the flight and to output at least one fixed trajectory for the flight.

According to an embodiment, the at least one trajectory of the flight comprises at least one of time series of times, latitudes, longitudes or altitudes associated with the flight track points.

According to an embodiment, the method comprises using an input interface to receive at least one of a departure airport, an arrival airport or an aircraft type of the flight.

According to an embodiment, the method comprises using the computing arrangement to format the flight track points by
converting timestamps in seconds if the timestamps are in different formats;
converting latitudes and longitudes in decimals if the latitudes and longitudes are in different formats; and
converting altitudes in meters above mean sea level if the altitudes are in different formats.

According to an embodiment, the method comprises using the computing arrangement to validate the flight track points by
discarding flight track points with timestamps that are associated with incorrect latitudes and longitudes, incorrect ground speeds, or discarding flight track points that are associated with incorrect vertical speeds, wherein the incorrect latitudes and longitudes comprises latitudes and longitudes exceeding predetermined values of longitude and latitude, wherein the incorrect ground speed corresponds to a ground speed exceeding a predetermined ground speed and wherein the incorrect vertical speed corresponds to a vertical speed exceeding a predetermined vertical speed, and selecting one or more flight track points with timestamps that are associated with at least one of: correct latitudes and longitudes, correct ground speeds, or correct vertical speeds, for validation.

According to an embodiment, the method comprises discarding incorrect flight track points by:
calculating at least one of: a ground speed or a vertical speed, for each flight track point using at least one of: a latitude data or a longitude data;
generating at least one of: a smoothed average ground speed or a smoothed average vertical speed, using a rolling median or mean method or at least one performance of the flight;
calculating a difference between the ground speed and the smoothed average ground speed and a difference between the vertical speed and the smoothed average vertical speed, respectively for each flight track point; and
discarding the flight track point upon at least one of: a) if the calculated difference for the ground speeds is more than 50 meters per second (m/s), or b) if the calculated difference for the vertical speeds is more than 5 m/s.

Optionally, performance data may be retrieved that is representative of at least one of the maximum, typical and minimum values of at least one of the following: ground speed, vertical speed, airspeed, rate of climb, rate of descent, rate of turn, thrust. Optionally, performance data may be retrieved according to at least one of: type of aircraft, take-off weight, take-off fuel weight, estimated fuel weight following the flight trajectory to a flight track point, thrust.

Optionally, performance data may be determined by reference to a model of an aircraft's energy, considering the kinetic energy, gravitational potential energy, drag and thrust. Beneficially, such a model may permit flight track points to be excluded or fixed where an energy change violates a law of physics or exceeds a permitted range of any one of: drag, thrust, ground speed, vertical speed, airspeed, rate of climb, rate of descent, rate of turn, thrust.

According to an embodiment, the method comprises using the flight trajectory algorithm to model the altitude at a flight track point without altitudes according to a flight phase if the rate of change of the altitude is not constant or is not provided, optionally considering the performance of the flight through at least one flight phase, where a flight phase may be at comprise: taxiing prior to take-off, take-off, climb, cruise, descent, holding, landing, taxiing following landing.

Optionally, in the flight trajectory system, the computing arrangement is configured to model the latitude and longitude at a flight track point without latitude or longitude according to a flight phase if the ground speed is not constant or is not provided, optionally considering the performance of the flight through at least one flight phase.

Optionally, a flight parameter is considered to exceed a value if it falls above a determined maximum or below (i.e. recedes) a minimum value, where a flight parameter includes any one of latitude, longitude, ground speed, vertical speed, airspeed, rate of climb, rate of decent, rate of turn, thrust.

According to an embodiment, the fixed trajectory comprises at least one of a complete time series of times, latitudes, longitudes, altitudes from when the flight is moving on the take-off runway up to when the flight reaches a speed of 0 kilometre per hour on the landing runway.

According to an embodiment, the trajectory comprises quality metrics that indicate a quality of the at least one received trajectory of the aircraft.

The advantages of the present method are thus identical to those disclosed above in connection with the present system and the embodiments listed above in connection with the system apply mutatis mutandis to the method.

The present disclosure provides a computer program product comprising instructions to cause the above system to carry out the above method.

The advantages of the present computer program product are thus identical to those disclosed above in connection with the present system and the embodiments listed above in connection with the system apply mutatis mutandis to the computer program product.

Embodiments of the present disclosure may generate the trajectory for the flight for estimating contaminants exposure of the flight on the fixed trajectory. Embodiments of the present disclosure may schedule the flight maintenance interventions based on the estimated contaminants exposure of the flight. Embodiments of the present disclosure may generate the fixed trajectory for the flight without any gaps, thereby improving the accuracy of estimation of the flight contaminant exposure. Embodiments of the present disclosure may assist to prioritise the flight maintenance interventions based on the estimated contaminants exposure. Embodiments of the present disclosure may assist to recommend or schedule maintenance events that optimise aircraft engine life, including both short-term interventions such as engine washes to clean out dust, and long-term interventions such as major maintenances or shop visits. Embodiments of the present disclosure may assist to recommend flight maintenance interventions such as engine washes when they are most needed (e.g. immediately after contaminant exposure) rather than when the results of damage of the aircraft engine are observed by sensors. Embodiments of the present disclosure may improve the accuracy of predictions of when maintenance is due.

DETAILED DESCRIPTION OF THE DRAWINGS

Figure 2:
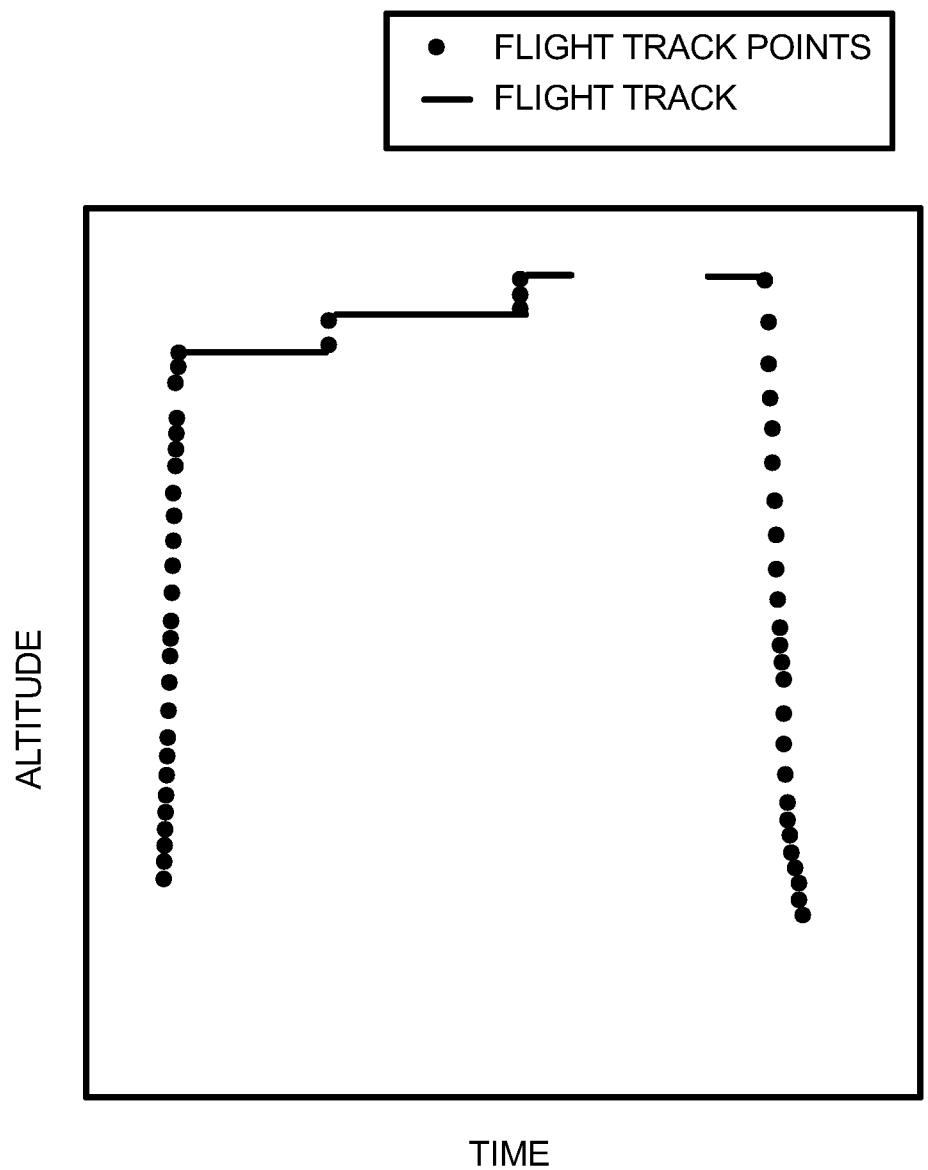
FIG. 2 is a graphical illustration that depicts a typical raw flight trajectory generated based on the flight track points.

FIG. 1 is a schematic illustration of a system 100 in accordance with an embodiment of the present disclosure. The system 100 comprises a computing arrangement 102, a storage medium 108 and an input interface 112. The computing arrangement 102 comprises a processor 104 and a memory 106. The storage medium 108 comprises a database 110. The function of these parts as has been described above FIG. 2 is a graphical illustration that depicts a typical raw flight trajectory generated based on the flight track points. The graphical illustration has an altitude in an ordinate Y-axis plotted against time in an abscissa X-axis. In the graphical illustration, there is shown the raw flight trajectory generated based on the flight track points includes gap(s) in the flight trajectory. For example, the gap(s) have occurred in the flight trajectory as the flight track points are not recorded above an ocean and near a ground while landing/taking off.

Figure 3:
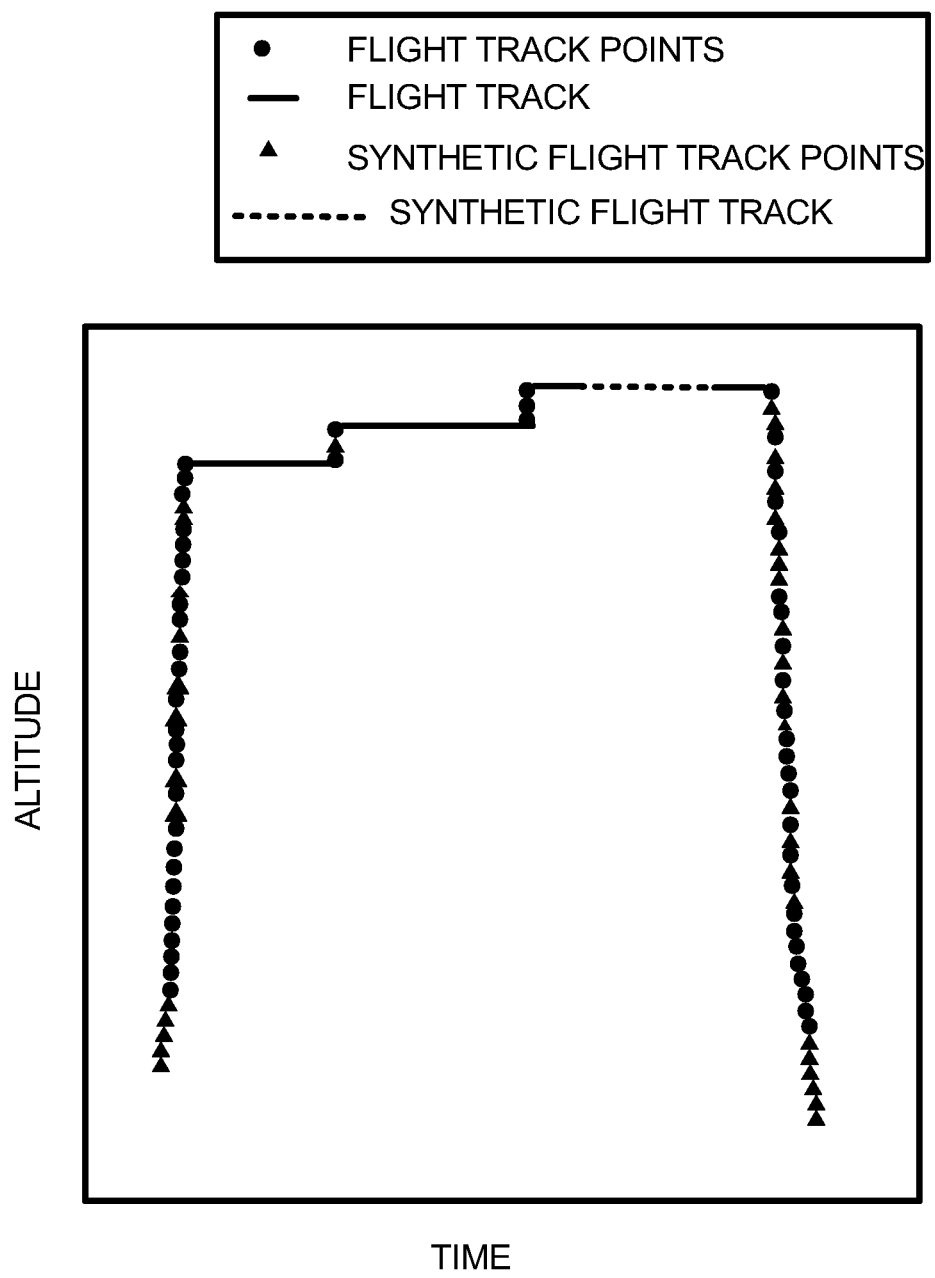
FIG. 3 is a graphical illustration that depicts a fixed trajectory of a flight generated using a flight trajectory algorithm in accordance with an embodiment of the present disclosure.

FIG. 3 is a graphical illustration that depicts a trajectory of a flight generated using a flight trajectory algorithm in accordance with an embodiment of the present disclosure. The graphical illustration has an altitude in an ordinate Y-axis plotted against time in an abscissa X-axis. The graphical illustration depicts that the trajectory generated using the flight trajectory algorithm comprises complete flight track points that elucidate a complete trajectory to be flown by the aircraft when in flight. The flight trajectory algorithm is beneficially implemented by a system to interpolate incomplete flight track point(s)/invalid flight track point(s) and extrapolate landing/taking off if not available to generate the fixed trajectory. For example, the system, using the flight trajectory algorithm, interpolates latitude(s) and longitude(s) along the great circle at the flight track point(s) without the latitude(s) and longitude(s). Furthermore, the system, using the flight trajectory algorithm, generates synthetic latitude(s) and longitude(s) by interpolating along the great circle at least one gap in at least one trajectory of the flight. Also, the system, using the flight trajectory algorithm, interpolates altitude(s) at flight track point(s) without altitude(s). The system uses the flight trajectory algorithm to model altitude according to the flight phase, if the rate of change of the altitude is not constant. If landing/take-off is not present, the system uses the flight trajectory algorithm to model the beginning and/or ending of the flight trajectory.

Figure 4A:
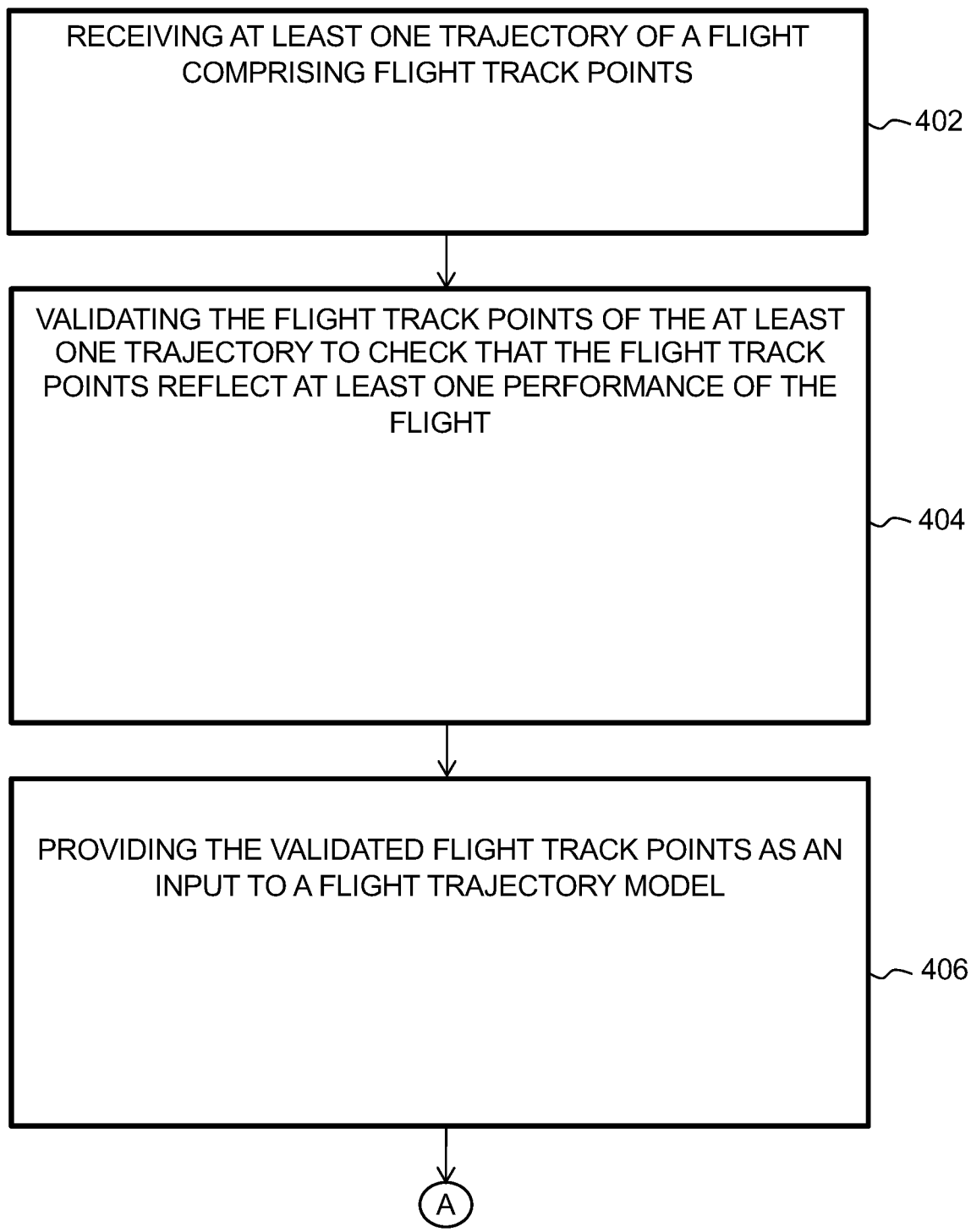
FIGS. 4A to 4B are flow diagrams illustrating steps of a method for (of) generating an aircraft flight trajectory using a flight trajectory algorithm in accordance with an embodiment of the present disclosure.
Figure 4B:
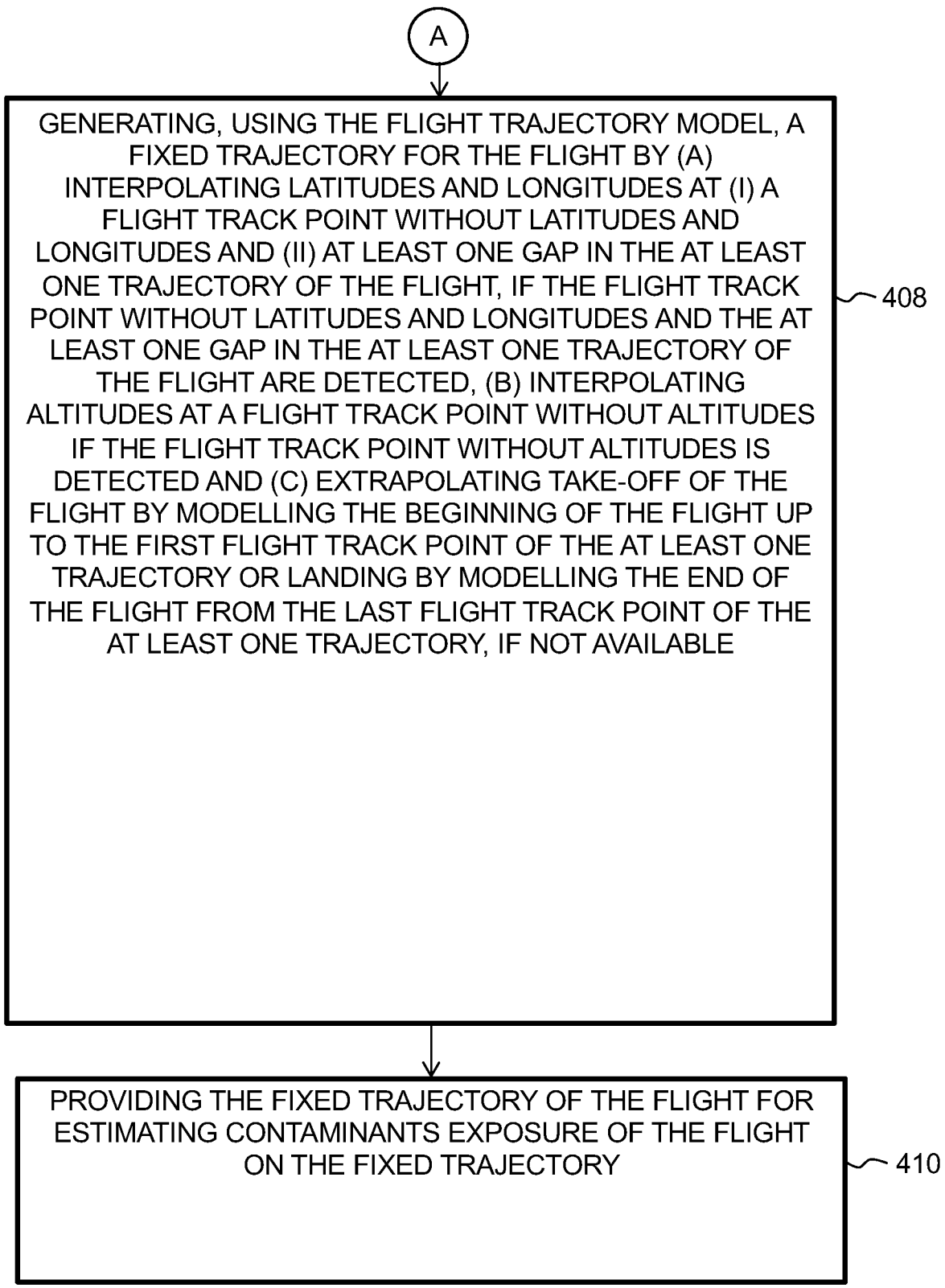

FIGS. 4A to 4B are flow diagrams that provide an illustration of steps of a method for (of) generating an aircraft flight trajectory using a flight trajectory algorithm in accordance with an embodiment of the present disclosure. At a step 402, at least one trajectory of a flight comprising flight track points is received. At a step 404, the flight track points of the at least one trajectory are validated to check that the flight track points reflect at least one performance of the flight. At a step 406, the validated flight track points are provided as inputs to a flight trajectory algorithm. At a step 408, using the flight trajectory algorithm, a fixed trajectory for the flight is generated by (a) interpolating latitudes and longitudes at (i) a flight track point without latitudes and longitudes and (ii) at least one gap in the at least one trajectory of the flight, if the flight track point without latitudes and longitudes and the at least one gap in the at least one trajectory of the flight are detected, (b) interpolating altitudes at a flight track point without altitudes if the flight track point without altitudes is detected and (c) extrapolating take-off of the flight by modelling the beginning of the flight up to the first flight track point of the at least one trajectory or landing by modelling the end of the flight from the last flight track point of the at least one trajectory, if not available. At a step 410, the trajectory of the flight is provided for estimating contaminants exposure of the aircraft when in flight on the generated trajectory.

Figure 5A:
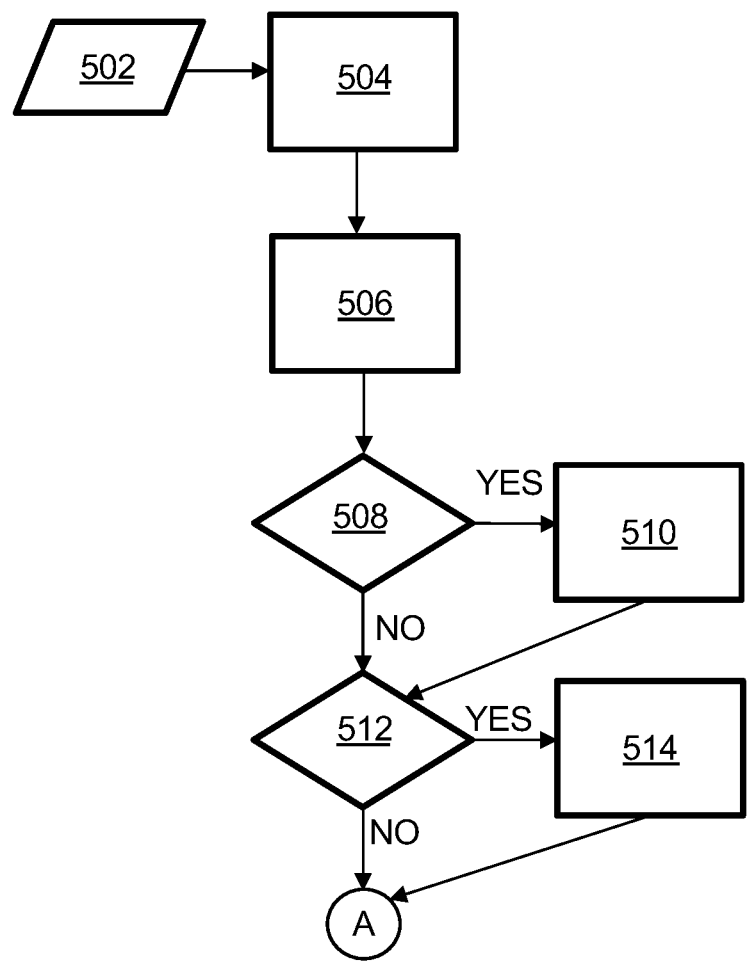
FIGS. 5A to 5B are flow diagrams illustrating detailed steps of a method for (of) generating an aircraft flight trajectory using a flight trajectory algorithm in accordance with an embodiment of the present disclosure; and In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.
Figure 5B:
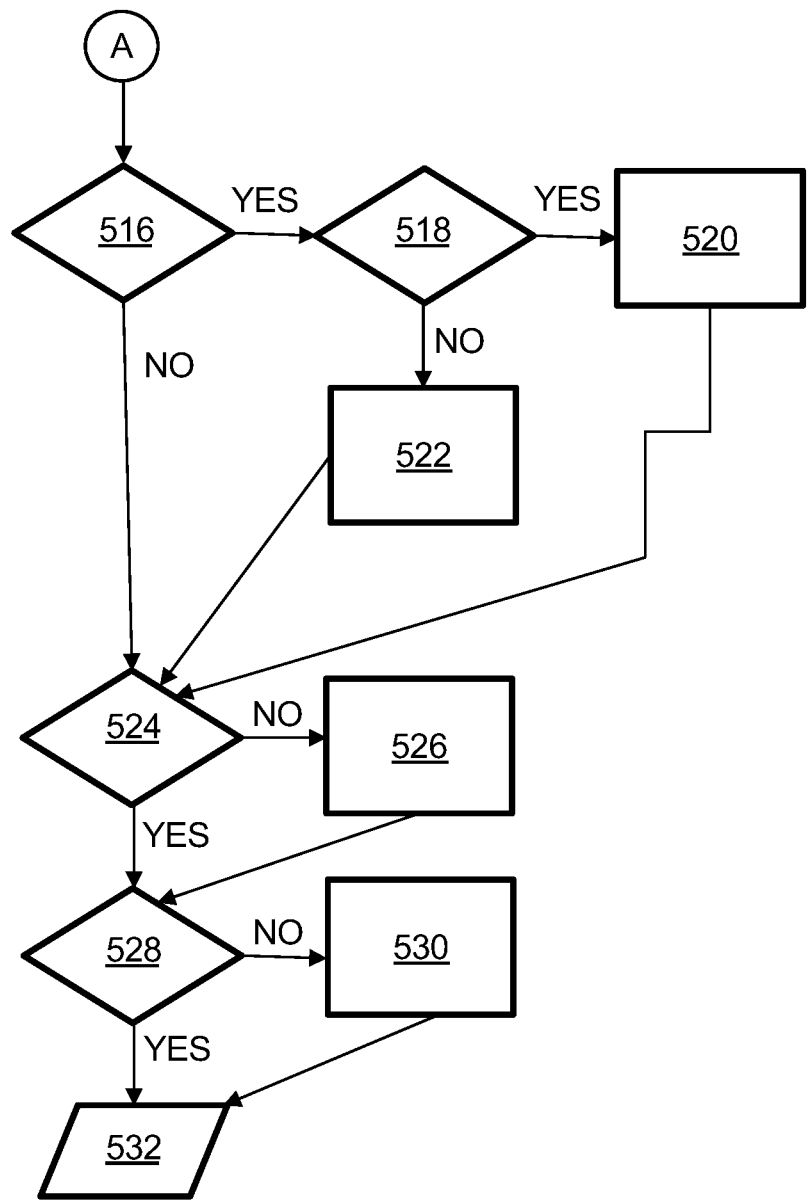

FIGS. 5A to 5B are flow diagrams that provide a detailed illustration of steps of a method for (of) generating a fixed aircraft flight trajectory using a flight trajectory algorithm in accordance with an embodiment of the present disclosure. At a step 502, at least one input interface receives an input comprising flight trajectory data, a departure time, a departure airport, an arrival airport, an arrival time and an aircraft type. The flight trajectory data optionally comprises time series of times, latitudes, longitudes and altitudes for at least one trajectory of the fight. At a step 504, the flight track points are formatted by (i) converting timestamps in seconds if the timestamps are in different formats, (ii) converting latitudes and longitudes in decimals if the latitudes and longitudes are in different formats, (iii) converting altitudes in meters above mean sea level if the altitudes are in different formats. At a step 506, the flight track points are validated by (i) discarding flight track points with timestamps that are associated with incorrect latitudes and longitudes (ii) discarding flight track points that are associated with incorrect ground speeds and (iii) discarding flight track points that are associated with incorrect vertical speeds.

In step 506, incorrect values of latitude, longitude ground speed and vertical speed are identified through analysis of the flight trade data. In particular, the computing arrangement first calculates a ground speed and vertical speed for each flight track point using latitude and longitude data. It then produces a smoothed average ground speed and vertical speed value using a rolling median and mean method. It then calculates the difference between the ground speed or vertical speed and the smoothed average ground speed or vertical speed for each data point. If a given flight track point has a ground speed that differs from the corresponding smoothed average value at that timestamp by more that 50 m/s then that corresponding flight track point is disregarded. If a given flight track point has a vertical speed that differs from the corresponding smoothed average value at that timestamp by more that 5 m/s then that corresponding flight track point is disregarded. At a step 508, flight track points are checked to determine whether they have associated latitudes or longitude data or if they are missing latitude or longitude data. If they are missing latitude or longitude data then the process proceeds to step 510, else the process proceeds to step 512. At a step 510, latitudes and longitudes are interpolated at the flight track points without latitudes/longitudes and then goes to a step 512. At the step 512, the computing arrangement determines if there is a gap in the at least one trajectory. If there is a gap, then the process proceeds to step 514, else the process proceeds to step 516. At a step 514, synthetic latitudes and longitudes are interpolated at least one gap in the at least one trajectory of the flight and then goes to a step 516. At step 516, the computing arrangement determines if any flight track points are missing altitude data. If flight track points are determined to be missing altitude data then the process proceeds to step 518, else the process proceeds to step 524. At step 518, the computing arrangement determines whether a rate of change of altitude in the flight track points is constant. If the rate is constant, then the process proceeds to step 520, else the process proceeds to step 522. At the step 520, altitudes are interpolated at the flight track points without altitudes and then goes to the step 524. At the step 522, altitude is modelled the flight track point without altitudes according to the flight phase and then goes to the step 524. At the step 524, the computing arrangement determines if a take-off event is detected in the at least one trajectory. If a take-off event is detected then the process proceeds to step 528, else the process proceeds to step 526. At the step 526, the take-off of the flight is extrapolated by modelling the beginning of the flight up to the first flight track point of the at least one trajectory and goes to a step 528. At step 528, the computing arrangement determines if a landing event is detected in the at least one trajectory. If a landing event is detected, then the process proceeds to step 532, else the process proceeds to step 530. At the step 530, the flight landing is extrapolated by modelling the end of the flight from the last flight track point of the at least one trajectory and then goes to the step 532. At the step 532, at least one output interface provides a fixed trajectory that includes complete flight track points and quality metrics that indicates a quality of the at least one received trajectory of the flight.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A flight trajectory system that estimates contaminant exposure experienced by a flight, comprising:
at least one input interface that is configured to receive at least one trajectory of a flight comprising flight track points;
a storage medium configured to contain instructions for executing a flight trajectory algorithm and a database of flight trajectory data; and
a computing arrangement coupled to the at least one input interface and the storage medium, wherein the computing arrangement receives the at least one trajectory of the flight and interrogates the database of flight trajectory data to:
validate the flight track points, wherein the flight track points are validated based on at least one performance of the flight,
generate a fixed trajectory for the flight based on the validated flight track points and the flight trajectory algorithm, by means of: interpolating latitudes and longitudes at (i) a flight track point without latitudes and longitudes and (ii) at least one gap in the at least one trajectory of the flight if the flight track point without latitudes and longitudes and the at least one gap in the at least one trajectory of the flight are detected,
interpolating altitudes at a flight track point without altitudes if the flight track point without altitudes is detected,
extrapolating take-off of the flight by modelling a beginning of the flight up to the first flight track point of the at least one trajectory or landing by modelling the end of the flight from the last flight track point of the at least one trajectory, if not available, and
analyze, using a flight trajectory model, the fixed trajectory of the flight to estimate contaminants exposure of the flight on the fixed trajectory, and wherein the contaminants comprise at least one of: dust, ice, atmospheric aerosol particles or corrosive gases.

2. The flight trajectory system as claimed in claim 1, wherein the at least one input interface is configured to receive historical flight trajectory data relating to a plurality of flights for training the flight trajectory algorithm.

3. The flight trajectory system as claimed in claim 1, wherein the computing arrangement validates the flight track points by discarding flight track points with timestamps that are associated with incorrect latitudes and longitudes, incorrect ground speeds, or incorrect vertical speeds, wherein the incorrect latitudes and longitudes comprises latitudes and longitudes exceeding predetermined values of longitude and latitude, wherein the incorrect ground speed corresponds to a ground speed exceeding or receding a predetermined range of ground speed and wherein the incorrect vertical speed corresponds to a vertical speed exceeding or receding a predetermined range of vertical speed, and selecting one or more flight track points with timestamps that are associated with at least one of: correct latitudes and longitudes, correct ground speeds, or correct vertical speeds, for validation.

4. The flight trajectory system as claimed in claim 1, wherein the computing arrangement discards incorrect flight track points by:

calculating at least one of: a ground speed or a vertical speed, for each flight track point using at least one of: a latitude data or a longitude data;

generating at least one of: a smoothed average ground speed or a smoothed average vertical speed, using a rolling median, mean method or at least one performance of the flight;

calculating a difference between the ground speed and the smoothed average ground speed and a difference between the vertical speed and the smoothed average vertical speed, respectively for each flight track point; and discarding the flight track point upon at least one of: a) if the calculated difference for the ground speeds is more than 50 meters per second (m/s), or b) if the calculated difference for the vertical speeds is more than 5 m/s.

5. The flight trajectory system as claimed in claim 1, wherein the computing arrangement is configured to model the altitude at a flight track point without altitudes according to a flight phase if the rate of change of the altitude is not constant.

6. The flight trajectory system as claimed in claim 1, wherein the fixed trajectory comprises at least one of a complete time series of times, latitudes, longitudes, altitudes from when the flight is moving on the take-off runway up to when the flight reaches speed of 0 kilometers per hour on the landing runway.

7. The flight trajectory system as claimed in claim 1, wherein the fixed trajectory comprises quality metrics that indicate a quality of the at least one received trajectory of the flight.

8. The flight trajectory system as claimed in claim 1, wherein the system is configured to schedule maintenance interventions for the aircraft in response to the estimated contaminants exposure.

9. A method of using a computing arrangement for estimating contaminant exposure experienced by a flight, comprising:

(a) receiving at least one trajectory of a flight comprising flight track points;

(b) validating the flight track points of the at least one trajectory, wherein the flight track points are validated based on at least one performance of the flight;

(c) generating, using the flight trajectory algorithm, a fixed trajectory for the flight, by means of interpolating latitudes and longitudes at (i) a flight track point without latitudes and longitudes and (ii) at least one gap in the at least one trajectory of the flight if the flight track point without latitudes and longitudes and the at least one gap in the at least one trajectory of the flight are detected;

interpolating altitudes at a flight track point without altitudes if the flight track point without altitudes is detected; and extrapolating take-off of the flight by modelling beginning of the flight up to the first flight track point of the at least one trajectory or landing by modelling the end of the flight from the last flight track point of the at least one trajectory, if not available;

(d) analyzing, using a flight trajectory model, the fixed trajectory of the flight to estimate contaminants exposure of the flight on the fixed trajectory, and wherein the contaminants comprise at least one of: dust, ice, atmospheric aerosol particles or corrosive gases.

10. The method as claimed in claim 9, wherein the method comprises calibrating, training or optimizing the flight trajectory algorithm using historical flight trajectory data relating to a plurality of flights, wherein the flight trajectory algorithm is configured to receive at least one trajectory of the flight and to output at least one fixed trajectory for the flight.

11. The method as claimed in claim 9, wherein the method comprises using the computing arrangement to validate the flight track points by discarding flight track points with timestamps that are associated with incorrect latitudes and longitudes, incorrect ground speeds or incorrect vertical speeds, wherein the incorrect latitudes and longitudes comprises latitudes and longitudes exceeding predetermined values of longitude and latitude, wherein the incorrect ground speed corresponds to a ground speed exceeding or receding a predetermined range of ground speed and wherein the incorrect vertical speed corresponds to a vertical speed exceeding or receding a predetermined vertical range of speed, and selecting one or more flight track points with timestamps that are associated with at least one of: correct latitudes and longitudes, correct ground speeds, or correct vertical speeds, for validation.

12. The method as claimed in claim 9, wherein method comprises discarding incorrect flight track points by:

calculating at least one of: a ground speed or a vertical speed, for each flight track point using at least one of: a latitude data or a longitude data;

generating at least one of: a smoothed average ground speed or a smoothed average vertical speed, using a rolling median, mean method, or at least one performance of the flight;

calculating a difference between the ground speed and the smoothed average ground speed and a difference between the vertical speed and the smoothed average vertical speed, respectively for each flight track point; and discarding the flight track point upon at least one of: a) if the calculated difference for the ground speeds is more than 50 meters per second (m/s), or b) if the calculated difference for the vertical speeds is more than 5 m/s.

13. The method as claimed in claim 9, wherein the method comprises using the flight trajectory algorithm to model the altitude at a flight track point without altitudes according to a flight phase if the rate of change of the altitude is not constant.

14. The method as claimed in claim 9, wherein the fixed trajectory comprises at least one of a complete time series of times, latitudes, longitudes, altitudes from when the flight is moving on the take-off runway up to when the flight reaches speed of 0 kilometers per hour on the landing runway.

15. The method as claimed in claim 9, wherein the method includes scheduling maintenance interventions for the aircraft in response to the estimated contaminants exposure.

\* \* \* \* \*